Dec. 6, 1938.  A. M. JOHNSON  2,139,234
CARRIAGE MOUNTING
Filed July 9, 1936  2 Sheets-Sheet 2
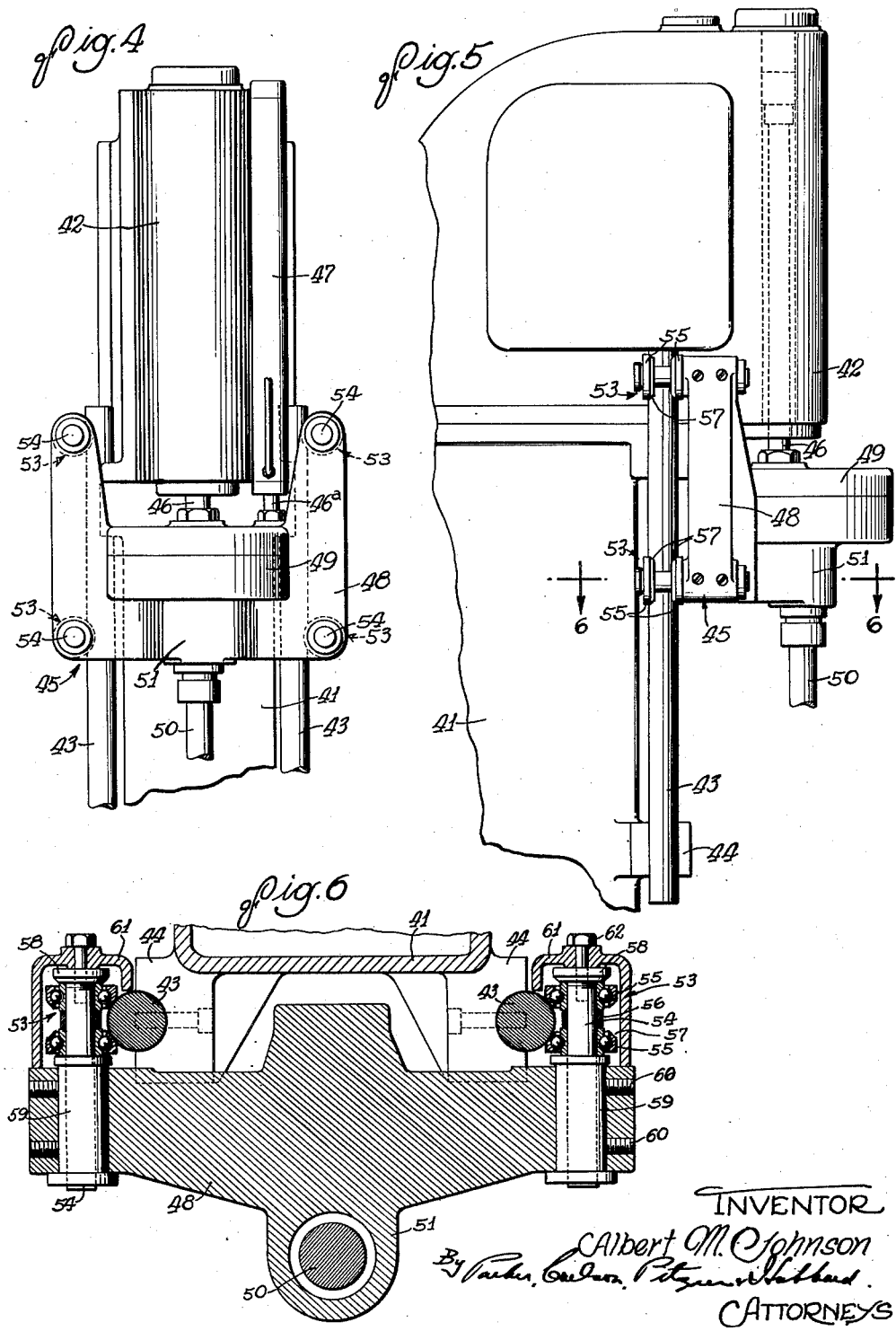

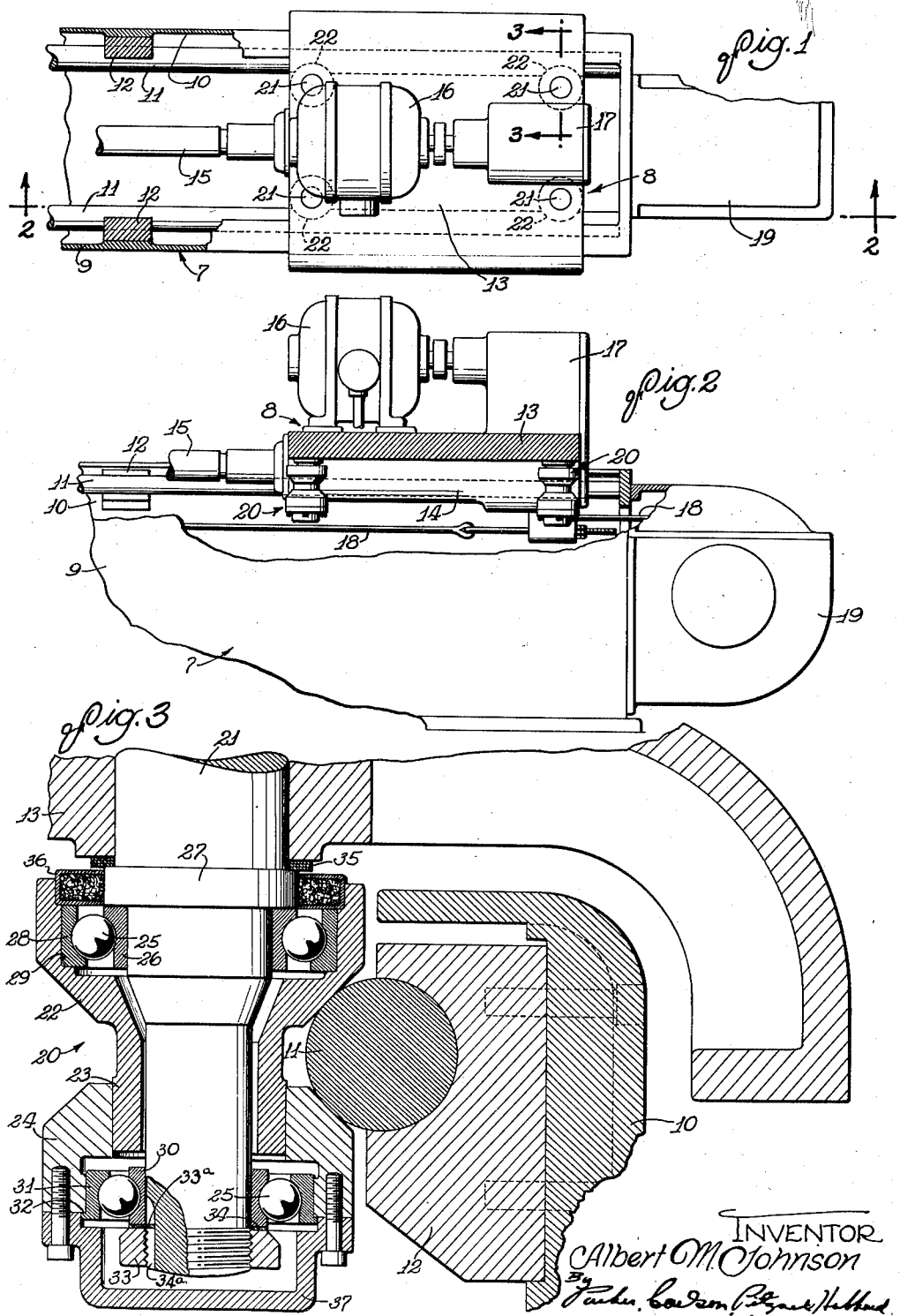

Patented Dec. 6, 1938

2,139,234

UNITED STATES PATENT OFFICE 2,139,234

CARRIAGE MOUNTING

Albert M. Johnson, Rockford, Ill., assignor to Barnes Drill Co., Rockford, Ill., a corporation of Illinois Application July 9, 1936, Serial No. 89,728

4 Claims. (Cl. 308—6)

The invention relates generally to machine tool structures which include a reciprocatory element, such as a head, table, carriage, or the like, and it has particular reference to the mounting of the element for movement on a track or guideway. This application is a continuation in part of my prior application, Serial No. 3,714 filed January 28, 1935, now Patent No. 2,106,216, issued January 25, 1938.

The primary object of the invention is the provision of an improved bearing support for a reciprocatory element of the above character which substantially eliminates any possibility of vibration or chatter when the element is reciprocated at high speed, thereby insuring a superior grade of work.

Another object is to provide an improved antifriction mounting for the reciprocatory element of a machine tool which reduces friction between the reciprocatory element and the guideway to a minimum and materially reduces the power required to reciprocate the element.

A further object is to provide an improved antifriction bearing support for a reciprocatory element, which, while capable of maintaining the element in exact alinement free from lost motion over a long period of use, may be easily adjusted to take up any lost motion that may occur.

Other objects and advantages of the invention will become apparent from the following detailed description of the preferred embodiment illustrated in the accompanying drawings, in which:

Fig. 1 is a fragmentary plan view of a machine tool structure, embodying the features of the invention.

Fig. 2 is a side elevational view, partly in section taken along the line 2—2 of Fig. 1.

Fig. 3 is a detailed sectional view taken along the line 3—3 of Fig. 1.

Fig. 4 is a fragmentary elevational view of the machine tool structure embodying a modified form of the invention.

Fig. 5 is a side view of the structure shown in Fig. 4.

Fig. 6 is a transverse sectional view taken along the line 6—6 of Fig. 5.

By way of illustration, the invention has been shown and will be described hereinafter as embodied in honing machines wherein the reciprocatory element comprises a head or carriage in which the tool carrying spindle is journaled. It will be understood, of course, that this is not intended as a limitation of the invention to the particular type of machine tool disclosed, it being contemplated that various changes and modifications may be made by those skilled in the art to adapt the invention to other types of machine tools. It will also be understood that various changes in the form, construction and arrangement of the parts may be made without departing from the spirit and scope of the invention as expressed in the appended claims.

Referring now to Figs. 1, 2 and 3, the invention is shown incorporated in a honing machine of the horizontal type. The machine includes generally, a frame or bed 7, upon which a spindle carriage 8 is supported for reciprocation. The bed 7 is in the form of an open rectangular box-like structure with vertical side walls 9 and 10. Supported on the respective side walls of the bed adjacent the upper edges thereof are a pair of elongated guide members 11 forming a track or guideway for the spindle head or carriage 8. The guide members 11 are preferably in the form of cylindrical rods or bars, although bars of other shapes which present two opposed bearing surfaces may be employed if desired. As herein shown, the guide bars are supported by spacing blocks 12 bolted or otherwise secured to the side walls of the bed to hold the bars rigidly in parallel spaced relation.

In the particular machine illustrated, the spindle carriage 8 comprises a flat, generally rectangular base 13, having a longitudinally extending elongated bearing 14 for supporting a tool spindle 15. Mounted on the carriage is a motor 16 and an enclosed gear train 17 for driving the spindle. Reciprocation of the carriage may be effected by any suitable means, such as the drum and cable mechanism illustrated, wherein a cable 18 anchored at opposite ends to the carriage is alternately wound up on and paid out from a drum mounted in a housing 19 at the end of the bed.

For supporting and guiding the spindle carriage on the guideway with a minimum of frictional resistance, the carriage is provided with a plurality of spool shaped roller members 20 adapted to operatively engage the guide bars. The roller members are carried by studs 21 set in the base member 13 and projecting from the under side thereof, substantially perpendicular to the axes of the guide bars. As herein shown, four roller members are provided. These are arranged in pairs at opposite sides of the carriage positioned so as to engage the respective guide bars at substantially spaced points, whereby to hold the carriage rigidly against lateral movement relative to the guideway. Other arrangements of the rollers or additional rollers may be employed if desired.

Referring now to Fig. 3, each of the roller members consists, in its preferred form, of a hollow, generally cylindrical upper bearing 22, having a conically formed intermediate portion providing an inclined bearing surface and a cylindrical depending extension 23 telescoped into a suitable recess in a second bearing member 24. The bearing member 24 is also of generally cylindrical form and the edge adjacent the upper bearing member is chamfered to provide a bearing surface inclined at an angle to the bearing surface of the upper member. Preferably the extension 23 has a tight sliding fit in the member 24 permitting the bearing members to be adjusted relative to each other but, at the same time, effectually preventing side play. The two bearing members thus constitute a spool-shaped roller unit which is supported at its upper and lower ends by conventional anti-friction bearings, each comprising a series of steel balls 25. The balls comprising the upper bearing are disposed between an inner race ring 26 which abuts against the shoulder of an annular flange 27 formed on the stud 21, and an outer race ring 28 fitting into a recess 29, formed in the upper part of the bearing member 22.

The balls comprising the lower bearing are disposed between an inner race ring 30 slidably mounted on the stud 21 and an outer race ring 31 fitting into a recess formed in the bearing member 24. The outer race ring 31 is provided with an annular flange 32 which overhangs the lower edge of the bearing member 24 and thus limits the movement of the race ring relative to the member.

A nut 33 threaded onto the end of the stud holds the lower bearing in place on the stud and provides a convenient means for adjusting the position of the lower bearing member 24 relative to the upper bearing member 22. Accidental displacement of the bearing is prevented by a lock washer 34 interposed between the nut 33 and the race ring 30 and having a projecting lug 33ª riding in a suitable slot 34ª in the stud 21. By turning the nut 33, the lower bearing member can be moved toward or from the upper bearing member to adjust the inclined bearing surfaces of the members relative to the guide bar 11. This adjustment is utilized to take up lost motion between the roller member and the guide bar due to wear of the parts and for alining the carriage 8 with respect to the guideway. Shims 35 may be inserted between the base 13 and the shoulder 27 of the stud when necessary to level up the carriage on the guideway.

As will be seen by reference to Fig. 3, the inclined bearing surfaces of the opposed bearing members 22 and 24 engage the guide bar 11 at angularly spaced points disposed on opposite sides of a plane intersecting the axes of the two guide bars. The carriage is thus free to reciprocate on the guideway while lateral movement is effectually prevented by the clamping action of the bearing members on the guide bars. In the embodiment illustrated, the weight of the carriage is carried by the members 22 whose downwardly facing, inwardly inclined bearing surfaces rest upon the respective guide bars. Vertical movement of the carriage is prevented by bearing members 24, whose upwardly facing, inwardly inclined bearing surfaces engage the guide bars 11 at points below the axes of the bars. By properly adjusting the relative positions of the two bearing members, lost motion between the rollers and the guide bars may be entirely eliminated without materially increasing the frictional resistance opposing the reciprocation of the carriage.

As herein shown, the recess 29 in the upper bearing unit is closed by an oil retaining ring 36 of conventional type which effectually prevents the escape of lubricant from the bearing and also prevents the entrance of dirt or grit thereto. The adjusting nut 33 and lower bearing unit may be conveniently enclosed in a cup shaped cover member 37, bolted or otherwise secured to the bearing member 24. Thus, the interior of the roller member forms a closed chamber which may be filled with oil or grease to insure proper lubrication of the bearings.

Referring now to Figs. 4, 5 and 6, a modified form of the invention is shown incorporated in a honing machine of the upright type. In the particular embodiment illustrated, the machine includes an upright column 41, having a column head 42 mounted thereon in overhanging relation to the face of the column. Supported on the face of the column is a vertical guideway comprising in the present instance, a pair of cylindrical guide rods 43 mounted in parallel spaced relation on brackets 44 projecting from the column. A spindle head 45 is mounted for reciprocation on the guideway in a substantially vertical plane.

As herein shown, the spindle head 45 is reciprocated by a hydraulic cylinder and piston mechanism enclosed in projecting head 42, and connected therewith by a main piston rod 46. The weight of the head is counterbalanced by a pneumatic counterbalancing device having a cylinder 47 mounted at one side of the column head 42. A piston (not shown) reciprocable within the cylinder 47 is operatively connected with the spindle head by a piston rod 46ª anchored to the head at one side of the main piston rod 46. Preferably, the spindle head 45 comprises a generally rectangular base 48 having, in the present instance, an integrally formed gear box 49 for driving a tool carrying spindle 50, the spindle being journaled in a suitable bearing 51 on the spindle head. In this instance, the head is substantially wider than the guideway formed by the guide bars 43 so that the sides of the head extend beyond the respective guide bars.

The spindle head 45 is supported for reciprocation on the guideway by means of four generally spool shaped roller members 53. These may be of the same general construction as the roller members 20, hereinbefore described, or of the preferred form illustrated. In this case, however, the roller members are arranged to engage the outer sides of the guide bars, thus leaving the space between the bars available for other purposes and providing a wide, rigid bearing support for the head.

In the particular form disclosed, the roller members 53 differ somewhat in construction from the rollers 20 although they function in substantially the same manner. Referring to Fig. 6, the roller members are mounted on studs 54 set in the base 48 normal to the plane of the base. Each roller member comprises a pair of independent ball bearing units 55 mounted on the projecting end of the stud 54 and spaced apart by a sleeve member 56 carried by the stud. The adjacent edges of the bearing units may be chamfered as at 57 to provide inclined bearing surfaces for engagement with the surface of the guide bar on opposite sides of the plane intersecting the axes of the two bars. For retaining the bearing units in place, a nut 58 is threaded onto the end of the stud for engagement with the inner race ring of the outermost bearing unit.

To provide for the adjustment of the roller members relative to the guide bars, each of the studs 54 is mounted in an eccentrically formed aperture in a sleeve or bushing 59 rotatably supported in the base 48. By rotating the bushing 59 the stud and roller assembly may be moved toward or from the associated guide bar to take up any lost motion due to wear of the parts and to aline the spindle head accurately relative to the guideway. Locking screws 60 threading into the base and engaging the adjusting sleeve 59 provide convenient means for locking the sleeve and roller assembly in adjusted position.

An individual guard 61 protects each roller assembly from dirt or foreign matter. As herein shown, the guard 61 is of generally cylindrical construction and is provided with an opening in the side adjacent guide bar 43. The guard may be conveniently secured to the stud as by a bolt 62 threading into the projecting end of the stud. Thus, the guards may be removed conveniently for inspecting and lubricating the bearing units of the roller assembly.

With the mounting above described, the carriage 45 is freely reciprocable upon the guideway, the bearing support offering a minimum of frictional resistance to such movement. Moreover, jamming of the carriage on the guideway due to the torque exerted by the rotation of the tool spindle or to the off-center attachment of the counterbalancing device is effectually prevented, and smooth, vibrationless reciprocation is insured.

It will be apparent from the foregoing description that the invention provides an improved bearing support for the reciprocatory element of a machine tool. The element is rigidly supported so that it may be reciprocated rapidly without vibration or chatter. The bearing support offers a minimum of frictional resistance to the reciprocation of the element, thereby materially reducing the power required to reciprocate the same. Moreover, the bearing support may be easily adjusted to take up lost motion due to wear of the parts and, by reason of the improved construction, the reciprocatory element is maintained in exact alinement and free from lost motion over long periods of use.

I claim as my invention:

1. In a machine tool structure having a frame and a reciprocatory head, in combination, a guideway for the head comprising a pair of elongated guide bars rigidly mounted on the frame in parallel spaced relation, bearing members carried at each side of the head for engagement with the respective guide bars, each of said members comprising a stud mounted on the head adjacent one of the guide bars and substantially perpendicular to the common axial plane of the guide bars, a roller rotatably supported on the stud having a pair of tapered bearing surfaces formed thereon, and oppositely inclined relative to the axis of rotation of the roller, said surfaces being formed to provide a line contact with the associated guide bar on opposite sides of the common axial plane of the two guide bars whereby to hold the head rigidly against movement in any direction except longitudinally of the guideway while said roller rotates so as to offer a minimum of frictional resistance to the reciprocation of the head on the guideway, and means for adjusting the position of the bearing surfaces relative to the associated guide bar to compensate for wear of the roller or the bar.

2. In a machine tool structure, in combination, a frame, a guideway comprising a pair of elongated guide members rigidly supported on said frame in parallel spaced relation, a reciprocatory head, a plurality of studs projecting from said head substantially perpendicular to the plane of said guideway, said studs being arranged in groups on opposite sides of said head, the studs of each group being disposed adjacent a different one of said guide members, and bearing members mounted on said studs coacting with said guide members to guide said head in its reciprocation on the guideway with a minimum of frictional resistance, each of said bearing members comprising a pair of cylindrical elements, bearing surfaces formed on adjacent edges of said elements, said bearing surfaces being inclined so as to present a straight sided generally V-shaped channel for the reception of the associated guide member, said elements being spaced apart longitudinally of the stud so that only the bearing surfaces of the elements engage the guide bar, the points of engagement being on opposite sides of the bar to prevent movement of the head transversely of the guideway while offering a minimum of frictional resistance to the reciprocation of the head of the guideway.

3. In a machine tool having a reciprocatory part, in combination, a bed, a guideway for said part comprising a pair of elongated guide bars supported on said bed in parallel spaced relation, means for supporting the reciprocatory part on said guideway with a minimum of frictional resistance to its reciprocation, said supporting means including roller members carried by the part for engagement with said guide bars, each of said roller members including a supporting member rigidly secured to the reciprocatory part with its axis disposed substantially perpendicular to the common axial plane of the guide bars, separable bearing elements mounted on said supporting member for rotation about the axis of the member, said elements having oppositely inclined faces bearing on opposite sides of the associated guide bar, and means for adjusting the relative positions of said separable bearing elements on said supporting member to take up the wear of the roller member and the guide bar.

4. In a machine tool having a reciprocating part, in combination, a bed, a guideway for said part comprising a pair of cylindrical guide bars supported on said bed in parallel spaced relation, means for supporting the reciprocating part on said guideway with a minimum of frictional resistance to its reciprocation, said supporting means including roller members carried by the part for engagement with said guide bars, each of said roller members including a supporting member rigidly secured to the reciprocatory part to project transversely of the axis of the associated guide bar and substantially perpendicular to the plane of the guideway, separable bearing elements rotatively supported on said member, oppositely inclined bearing surfaces formed on adjacent edges of said element disposed tangentially to the surface of the guide bar to engage the same respectively at points spaced apart by less than one-half the circumference of the bar whereby to prevent any movement of the head transversely of the guideway, and means for shifting one of said bearing elements relative to the other element to compensate for wear.

ALBERT M. JOHNSON.